United States Patent
Oh et al.

(10) Patent No.: US 8,674,624 B2
(45) Date of Patent: Mar. 18, 2014

(54) DC-DC CONVERTER AND LIGHT EMITTING DIODE DRIVING DEVICE INCLUDING THE SAME

(75) Inventors: Won Sik Oh, Seoul (KR); Gun Woo Moon, Daejeon (KR); Shin Young Cho, Daejeon (KR); Dae Youn Cho, Daejeon (KR)

(73) Assignees: Samsung Display Co., Ltd. (KR); Korea Advanced Institute of Science and Technology (KR)

( * ) Notice: Subject to any disclaimer, the term of this patent is extended or adjusted under 35 U.S.C. 154(b) by 174 days.

(21) Appl. No.: 13/416,228

(22) Filed: Mar. 9, 2012

(65) Prior Publication Data

US 2013/0113390 A1    May 9, 2013

(30) Foreign Application Priority Data

Nov. 7, 2011    (KR) .................. 10-2011-0115233

(51) Int. Cl.
*H05B 37/02* (2006.01)

(52) U.S. Cl.
USPC ..................................... 315/307; 315/240

(58) Field of Classification Search
USPC .................. 315/291, 307, 240, 244, 245
See application file for complete search history.

(56) References Cited

U.S. PATENT DOCUMENTS

| | | | |
|---|---|---|---|
| 6,314,002 B1 | 11/2001 | Qian et al. | |
| 6,674,247 B1* | 1/2004 | Mead et al. | 315/241 P |
| 7,262,559 B2 | 8/2007 | Tripathi et al. | |
| 7,269,038 B2 | 9/2007 | Shekhawat et al. | |
| 7,317,302 B1 | 1/2008 | Collins | |
| 7,332,897 B2* | 2/2008 | Lee et al. | 323/222 |
| 7,385,833 B2* | 6/2008 | Keung | 363/56.12 |
| 7,583,035 B2 | 9/2009 | Shteynberg et al. | |
| 2010/0188008 A1* | 7/2010 | Vail | 315/224 |
| 2010/0296324 A1 | 11/2010 | Boeke | |

FOREIGN PATENT DOCUMENTS

| | | |
|---|---|---|
| JP | 2004514396 A | 5/2004 |
| JP | 2006511082 A | 3/2006 |
| JP | 2010245322 A | 10/2010 |
| KR | 1020080008759 A | 1/2008 |
| KR | 101018164 B1 | 2/2011 |
| KR | 101033364 B1 | 4/2011 |
| KR | 1020110035097 A | 4/2011 |

OTHER PUBLICATIONS

Q. Zhao et al., High-Efficiency, High Step-Up DC-DC Converters, IEEE Transactions on Power Electronics, vol. 18, No. 1, Jan. 2003., pp. 65-73.

* cited by examiner

*Primary Examiner* — Don Le
(74) *Attorney, Agent, or Firm* — Cantor Colburn LLP (57) ABSTRACT

A direct current to direct current converter includes: an input terminal; an output terminal having voltage higher than the input terminal; a coupled inductor boost cell including a coupled inductor connected to the input terminal, a switch connected to the coupled inductor, and an output diode connected to the output terminal; and a clamp and energy transfer cell including a clamp diode connected to the coupled inductor, a clamp capacitor connected to the clamp diode, and an energy transfer diode connected to the output diode.

20 Claims, 12 Drawing Sheets

DC-DC CONVERTER AND LIGHT EMITTING DIODE DRIVING DEVICE INCLUDING THE SAME

This application claims priority to Korean Patent Application No. 10-2011-0115233, filed on Nov. 7, 2011, and all the benefits accruing therefrom under 35 U.S.C. §119, the content of which in its entirety is herein incorporated by reference.

BACKGROUND OF THE INVENTION (a) Field of the Invention

A direct current to direct current (DC-DC) converter and a light emitting diode driving device including the same are provided.

(b) Description of the Related Art

A light emitting diode (hereinafter, referred to as an "LED") is primarily used as a light source in various display devices. While a known cold cathode fluorescent lamp (hereinafter, referred to as a "CCFL") requires an inverter which is driven by a high-frequency alternating current ("AC") current, the LED requires a converter which is driven by a DC current.

Unlike the inverter used in the CCFL, a DC-DC converter used in the LED includes a rectifier circuit part for generating the DC current. Further, an LED driving device may be operated by a pulse width modulation (hereinafter, referred to as a "PWM") dimming control method or an analog dimming control method in order to control luminance of the LED. The PWM dimming control method controls a brightness of the LED by controlling a ratio of on-off times of the LED according to a PWM signal. For example, when the PWM signal having the ratio of the on-off times of 4:1 is supplied to the LED, the brightness of the LED may be 80% of a maximal brightness. The analog dimming control method controls the brightness of the LED by controlling a current amount supplied to the LED.

The DC-DC converter used in the LED of the display device may be a boost converter which receives a low DC voltage to output a high DC voltage. For example, a DC voltage of 15 volts (V) to 30 V may be changed to a DC voltage of 100 V to 280 V by using the DC-DC converter. Since the DC-DC converter significantly changes a voltage level, a voltage stress on a circuit element configuring the DC-DC converter may be high, an electromagnetic interference ("EMI") may occur, and efficiency of the converter may be reduced.

BRIEF SUMMARY OF THE INVENTION

An exemplary embodiment of the invention provides a direct current to direct current ("DC-DC") converter, including: an input terminal; an output terminal having a voltage higher than a voltage of the input terminal; a coupled inductor boost cell including a coupled inductor connected to the input terminal, a switch connected to the coupled inductor, and an output diode connected to the output terminal; and a clamp and energy transfer cell including a clamp diode connected to the coupled inductor, a clamp capacitor connected to the clamp diode, and an energy transfer diode connected to the output diode.

The coupled inductor may include a magnetic inductor and a parasitic inductor connected to the magnetic inductor.

When the switch is turned on, energy from the input terminal may be stored in the magnetic inductor and the parasitic inductor and a difference between energy stored in the magnetic inductor and energy stored in the parasitic inductor may be stored in the clamp capacitor.

When the switch is turned off, energy stored in the magnetic inductor may be transferred to the output terminal and energy stored in the parasitic inductor may be stored in the clamp capacitor to be transferred to the output terminal.

The clamp diode and the clamp capacitor may limit a voltage applied to the switch.

The switch may include a first terminal connected to the coupled inductor and a second terminal connected to the input terminal.

The first terminal of the switch may be connected to the clamp diode and the second terminal of the switch may be connected to the clamp capacitor.

The energy transfer diode may include a first terminal connected to the second terminal of the switch and a second terminal connected to the output diode.

The energy transfer diode may include a first terminal connected to the first terminal of the switch and a second terminal connected to the output diode.

The energy transfer diode may include a first terminal connected to the coupled inductor and the input terminal and a second terminal connected to the first terminal and the output diode.

The DC-DC converter may be driven in a continuous conduction mode ("CCM") or a discontinuous conduction mode ("DCM").

The DC-DC converter may be driven in an above resonance mode or a below resonance mode.

Another exemplary embodiment of the invention provides a light emitting diode driving device including: a DC-DC converter converting an input voltage into an output voltage; and a light emitting diode connected to the converter, in which the DC-DC converter includes an input terminal; an output terminal having voltage higher than the voltage of the input terminal; a coupled inductor boost cell including a coupled inductor connected to the input terminal, a switch connected to the coupled inductor, and an output diode connected to the output terminal; and a clamp and energy transfer cell including a clamp diode connected to the coupled inductor, a clamp capacitor connected to the clamp diode, and an energy transfer diode connected to the output diode.

Still another exemplary embodiment of the invention provides a method of driving a light emitting diode light source using a DC-DC converter, the method including: providing an input voltage; transferring, responsive to a turn-on state of a switch, energy from the input voltage to a magnetic inductor and a parasitic inductor, while a difference between energy stored in the magnetic inductor and energy stored in the parasitic inductor is stored in the clamp capacitor; and transferring, responsive to a turn-off state of the switch, energy stored in the magnetic inductor to an output voltage and energy stored in the parasitic inductor to the clamp capacitor to be transferred to the output voltage, wherein a voltage across an output diode is clamped to the output voltage by using an energy transfer diode connected between the output diode and the switch or the input voltage, thereby reducing a voltage stress on the output diode.

BRIEF DESCRIPTION OF THE DRAWINGS

The above and other aspects, advantages and features of the invention will become more apparent by describing in further detail exemplary embodiments thereof with reference to the accompanying drawings, in which.

DETAILED DESCRIPTION OF THE INVENTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in further detail with reference to the accompanying drawings.

Figure 1:
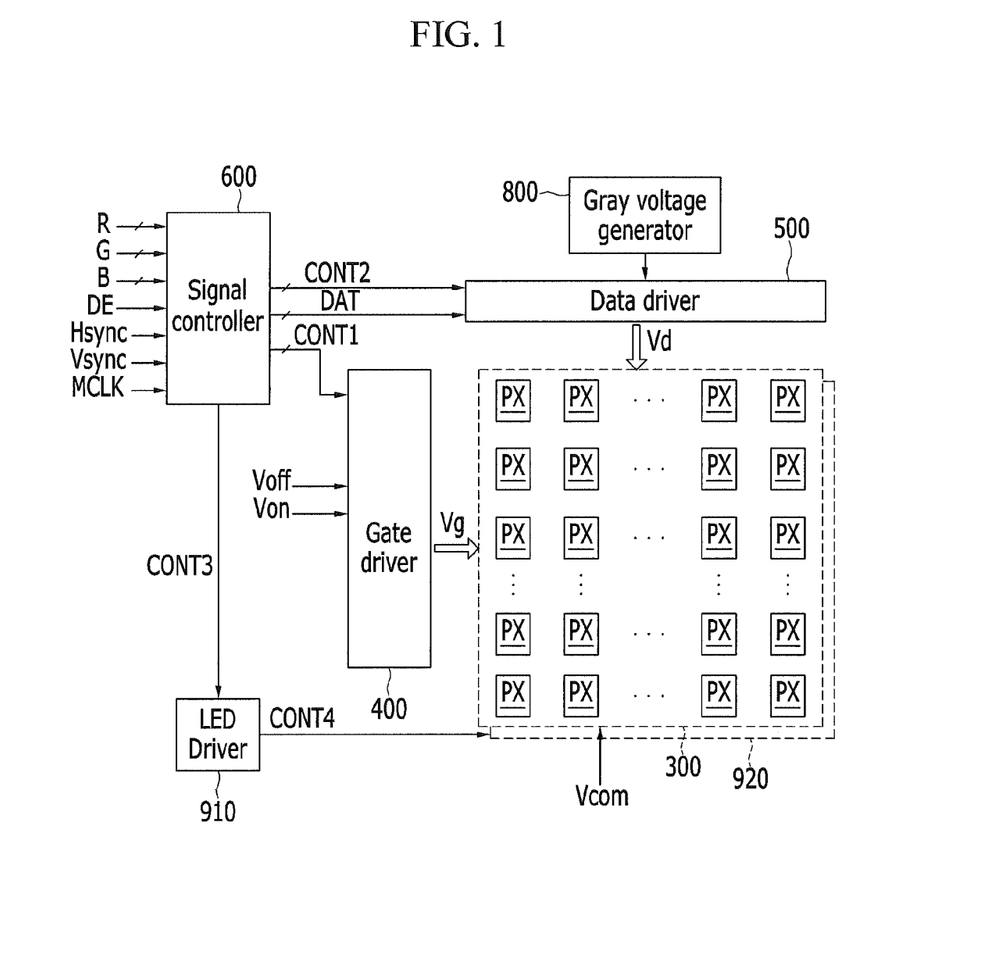
FIG. 1 is a schematic diagram illustrating an exemplary embodiment of a liquid crystal display according to the invention.

FIG. 1 is a schematic diagram illustrating an exemplary embodiment of a liquid crystal display according to of the invention.

Referring to FIG. 1, a liquid crystal panel assembly 300 includes a plurality of pixels PX arranged in a substantially matrix form. The plurality of the pixels PX is connected to a plurality of signal lines. The signal lines include a plurality of gate lines transferring gate signals (also, referred to as "scanning lines") and a plurality of data lines transferring data signals.

A backlight unit 920 is a light source of the liquid crystal display. Herein, the backlight unit 920 includes a light emitting diode ("LED"). Further, in an exemplary embodiment, the LED may be of an edge type.

An LED driver 910 controls, for example, an on/off time or brightness of the backlight unit 920 by using a control signal CONT4.

A gray voltage generator 800 generates two gray voltage sets (or reference gray voltage sets) relating to transmittance of a pixel. One set of two sets has a positive polarity with respect to a common voltage Vcom and the other set has a negative polarity.

A gate driver 400 is connected to the gate line of the liquid crystal panel assembly 300 to apply a gate signal including a gate-on voltage Von and a gate-off voltage Voff to the gate line.

A data driver 500 is connected to the data line of the liquid crystal panel assembly 300 to select a gray voltage provided from the gray voltage generator 800 and apply the selected gray voltage to the pixel as a data voltage. However, when the gray voltage generator 800 does not supply gray voltages for all gray levels, but supplies only a predetermined number of reference gray voltages, the data driver 500 divides the reference gray voltages to generate gray voltages corresponding to an entire gray scale and select the data voltage among the generated gray voltages.

A signal controller 600 controls the gate driver 400, the data driver 500, and the LED driver 910.

Each of driving devices 400, 500, 600, 800, and 910 may be directly mounted on the liquid crystal panel assembly 300 in at least one integrated circuit ("IC") chip form or mounted on a flexible printed circuit film (not shown) to be attached to the liquid crystal panel assembly 300 as a tape carrier package ("TCP"). Alternatively, the drivers 400, 500, 600, and 800 may be integrated to the liquid crystal panel assembly 300 together with the signal lines and a thin film transistor switching element Q. Further, the driving devices 400, 500, 600, and 800 may be integrated in a single chip. In this case, at least one of the drivers 400, 500, 600, and 800 or at least one circuit element of the drivers 400, 500, 600, and 800 may be disposed outside of the single chip.

The signal controller 600 receives input image signals R, G, and B and an input control signal controlling a display thereof from an external graphic controller (not shown). The input image signals R, G, and B have luminance information of each pixel PX and the luminance has a predetermined number, for example, $2^{10}$ (i.e., 1024), $2^8$ (i.e., 256), or $2^6$ (i.e., 64) number of gray levels.

Examples of the input control signal include a vertical synchronization signal Vsync, a horizontal synchronization signal Hsync, a main clock MCLK, and a data enable signal DE.

The signal controller 600 processes the input image signals R, G, and B according to operating conditions of the liquid crystal panel assembly 300 and the data driver 500, based on the input image signals R, G, and B and the input control signal. The signal controller 600 generates a gate control signal CONT1, a data control signal CONT2, a backlight control signal CONT3, and a processed image signal DAT and transmits the gate control signal CONT1 to the gate driver 400, outputs the data control signal CONT2 and the processed image signal DAT to the data driver 500, and transmits the backlight control signal CONT3 to the LED driver 910. The output processed image signal DAT is a digital signal having a predetermined number of values (or grays).

The gate control signal CONT1 includes a scanning start signal STV instructing to start scanning and at least one clock signal controlling an output period of the gate-on voltage Von. The gate control signal CONT1 may further include an output enable signal OE limiting a duration time of the gate-on voltage Von.

The data control signal CONT2 includes a horizontal synchronization start signal STH notifying a start of transmission of the image data for one pixel row, a load signal LOAD instructing to apply the data signal to data lines and a data clock signal HCLK. The data control signal CONT2 may further include an inversion signal RVS inverting a voltage polarity of the data signal with respect to the common voltage Vcom (hereinafter, referred to as a "polarity of the data signal").

According to the data control signal CONT2 from the signal controller 600, the data driver 500 receives the digital image signal DAT for one pixel row and selects the gray voltage corresponding to each digital image signal DAT, thereby converting a digital image signal DAT into an analog data signal. Next, the analog data signal is applied to the corresponding data lines. The number of the gray voltages generated by the gray voltage generator 800 is the same as the number of the grays represented by the digital image signal DAT.

The gate driver 400 applies the gate-on voltage Von to the gate lines according to the gate control signal CONT1 from the signal controller 600 to turn on the switching element Q connected to the gate lines. Then, the data signal applied to the data lines is applied to a corresponding pixel PX through the turned-on switching element Q.

A difference between a voltage of the data signal applied to the pixel PX and the common voltage Vcom is represented as a charged voltage of the liquid crystal capacitor ("CLC"), in other words, a pixel voltage. Liquid crystal molecules are differently arranged according to a level of the pixel voltage, and accordingly, polarization of light passing through a liquid crystal layer is changed depending on the level of the pixel voltage. The change of the polarization is represented by a change in transmittance of light through a polarizer attached to the display panel assembly 300. In this manner, the pixel PX displays luminance corresponding to the gray of the image signal DAT.

By repeating the above described process every horizontal period, 1 H, which is the same as a period of the horizontal synchronization signal Hsync and a period of the data enable signal DE, the gate-on voltage Von is sequentially applied to the plurality of gate lines to apply the data signal to the plurality of the pixels PX, thereby displaying an image of one frame.

When one frame ends and a next frame starts, a state of the inversion signal RVS to be applied to the data driver 500 is controlled so that a polarity of the data signal applied to each pixel PX is opposite to a polarity applied in a previous frame (which is referred to as "frame inversion"). In this case, the polarity of the data signal transmitted through one data line may be changed according to the state of the inversion signal RVS even in one frame (for example, as in a row inversion or a dot inversion) or polarities of the data signals applied to adjacent pixels in one pixel row may also be different from each other (for example, as in a column inversion or a dot inversion).

Figure 2:
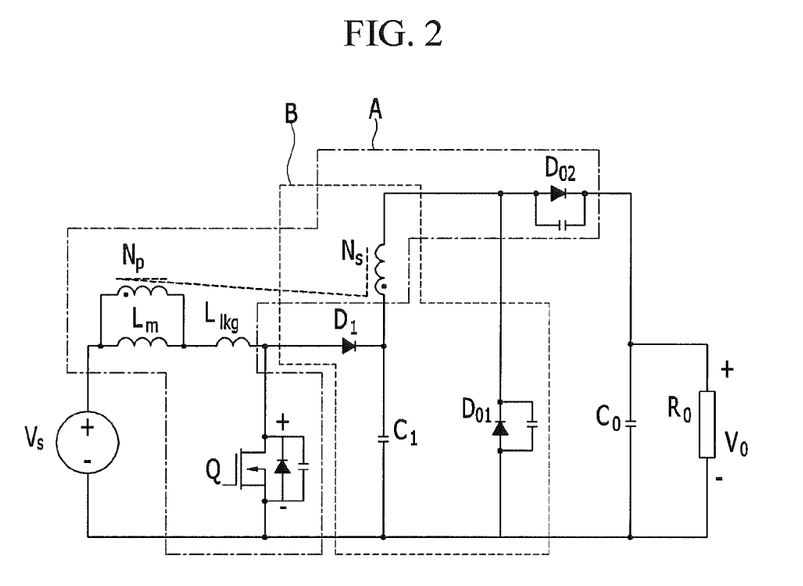
FIG. 2 is a circuit diagram illustrating an exemplary embodiment of a direct current to direct current ("DC-DC") converter according to the invention.

FIG. 2 is a circuit diagram illustrating an exemplary embodiment of a DC-DC converter according to the invention.

The LED driver 910 includes a DC-DC converter, as shown in FIG. 2, which generates a basic power supply for driving the LED. The DC-DC converter includes an input terminal $V_s$, an output terminal $V_o$, a coupled inductor boost cell A, and a clamp and energy transfer cell B.

A DC voltage of the output terminal $V_o$ is higher than a DC voltage $V_s$ of the input terminal. In an exemplary embodiment, the DC voltage of the input terminal $V_s$ may be about 15 volts (V) to about 30 V and the DC voltage $V_o$ of the output terminal may be about 100 V to about 280 V. The output terminal includes an output resistor $R_o$ and an output capacitor $C_o$ connected to the output resistor $R_o$ in parallel.

The coupled inductor boost cell A includes a magnetic inductor $L_m$, a parasitic inductor $L_{lkg}$, a switch Q, and an output diode $D_{O2}$. When the switch Q is turned on, energy from the input terminal $V_s$ may be stored in the magnetic inductor $L_m$ and the parasitic inductor $L_{lkg}$ and a difference between the energies stored in the magnetic inductor $L_m$ and the parasitic inductor $L_{lkg}$ may be stored in a clamp capacitor $C_1$. When the switch Q is turned off, the energy stored in the magnetic inductor $L_m$ may be directly transferred to the output terminal $V_o$ and the energy stored in the parasitic inductor $L_{lkg}$ may be stored in the clamp capacitor $C_1$ to be transferred to the output terminal $V_o$.

The clamp and energy transfer cell B includes a clamp diode $D_1$, the clamp capacitor $C_1$, and an energy transfer diode $D_{O1}$. The clamp diode $D_1$ and the clamp capacitor $C_1$ may limit a voltage applied to the switch Q to a low voltage. During when the switch Q is turned on, energy may be transferred to the clamp capacitor $C_1$ by the energy transfer diode $D_{O1}$, and as a result, the voltage applied to the output diode $D_{O2}$ may be substantially clamped to the voltage of the output terminal $V_o$. Accordingly, the output diode $D_{O2}$ having a low voltage stress limit may be used, such that a conduction loss of the output diode $D_{O2}$ may be reduced, and as a result, efficiency of the DC-DC converter may increase and an electromagnetic interference may be reduced.

In other words, in a case where the energy transfer diode $D_{O1}$ is not provided, when the voltage of the input terminal $V_s$ is about 24 V, the voltage of the output terminal $V_o$ is about 220 V, and a turn ratio is about 1/6.8, the voltage applied to the output diode $D_{O2}$ is about 600 V or higher, such that two diodes which each have a voltage stress limit of about 600 V may be coupled with each other in series. However, when the energy transfer diode $D_{O1}$ is provided, as in the exemplary embodiment of the invention, the voltage applied to the output diode $D_{O2}$ may be clamped at about 220 V. The turn ratio in the exemplary embodiment of FIG. 2 is $N_s/N_p$, where $N_p$ is a number of turn of a primary winding and $N_s$ is a number of turn of a secondary winding.

The DC-DC converter may be driven in a continuous conduction mode ("CCM") or a discontinuous conduction mode ("DCM"). When the DC-DC converter is driven in the discontinuous conduction mode, the discontinuous conduction mode may be classified into three types according to a relationship between a resonance period $T_R$ and a duty ratio DT of the switch Q.

The DC-DC converter may be driven in a higher resonant mode when satisfying the following Equation 1, resonance lower resonant mode when satisfying the following Equation 2, and a non resonant mode when satisfying the following Equation 3.

$$\frac{T_R}{2} < DT \quad \text{[Equation 1]}$$

$$\frac{T_R}{2} > DT \quad \text{[Equation 2]}$$

$$V_{c1} > V_s/n \quad \text{[Equation 3]}$$

In Equations 1 to 3, $T_R$ represents the resonance period, which is calculated by the following Equation 4, $V_{c1}$ represents a voltage applied to the clamp diode $C_1$, $V_s$ represents a voltage of the input terminal, and n represents a turn ratio.

$$T_R = 2\pi\sqrt{L_{lkg}C_1}/n \quad \text{[Equation 4]}$$

In Equation 4, $L_{lkg}$ represents an inductance of the parasitic inductor $L_{lkg}$, $C_1$ represents a capacitance of the clamp diode $C_1$, and n represents a turn ratio.

The DC-DC converter may be driven in the lower resonant mode with high efficiency.

Figure 3:
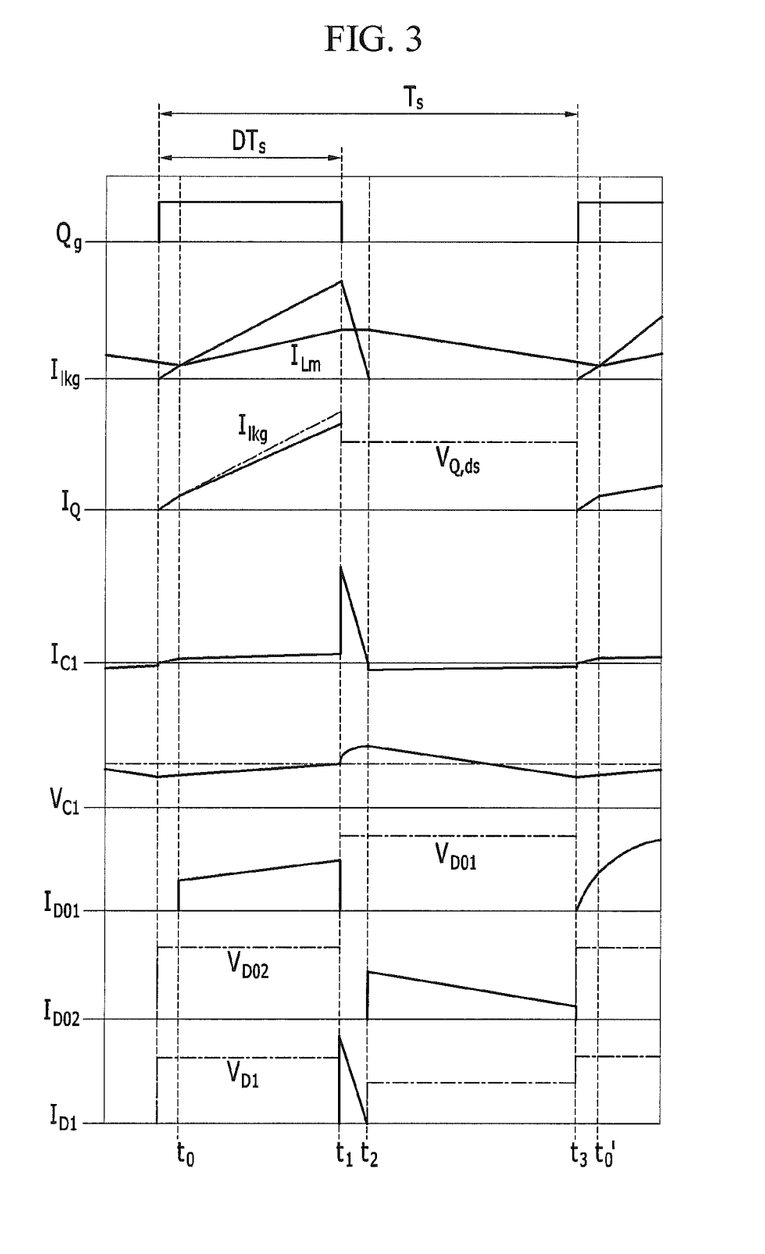
FIG. 3 is a signal waveform diagram of a DC-DC converter driven according to an exemplary embodiment of the invention.
Figure 4:
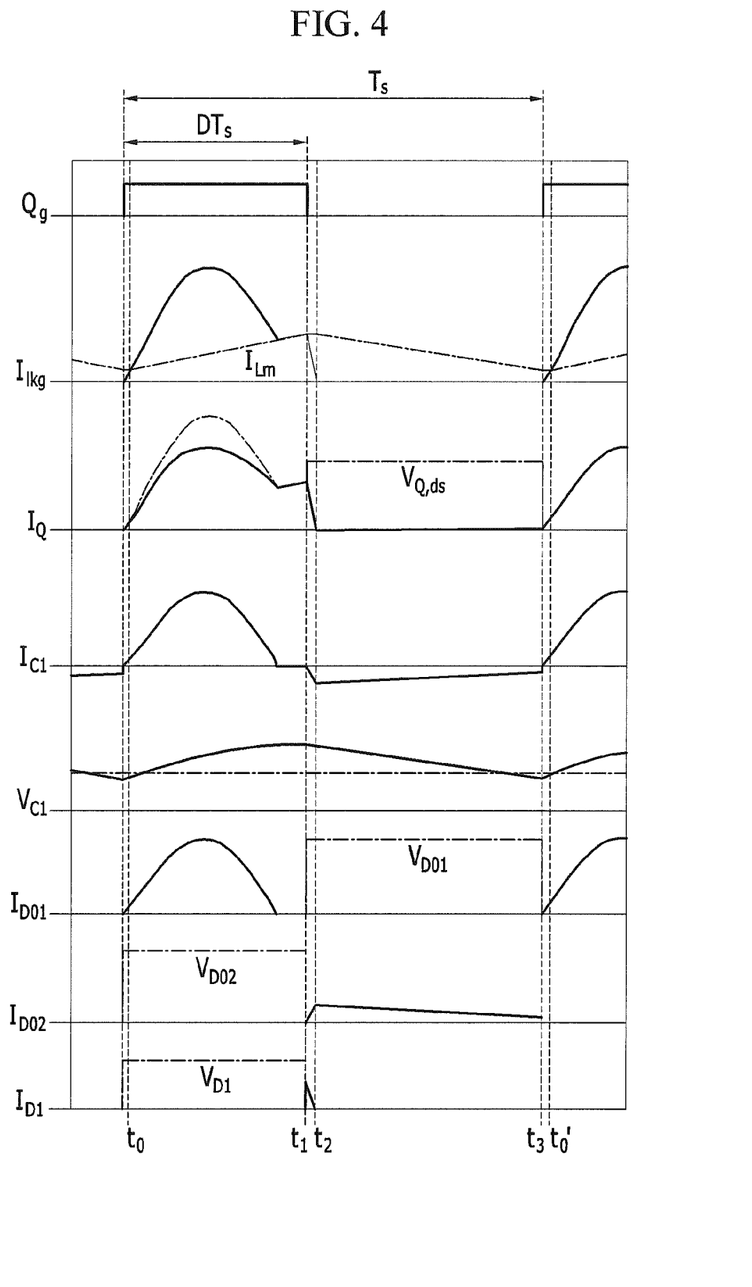
FIG. 4 is a signal waveform diagram of a DC-DC converter driven according to another exemplary embodiment of the invention.

FIG. 3 is a signal waveform diagram of a DC-DC converter according to an exemplary embodiment of the invention and FIG. 4 is a signal waveform diagram of a DC-DC converter according to another exemplary embodiment of the invention.

FIG. 3 is a signal waveform diagram when the DC-DC converter is driven in the above resonance mode. The higher resonant mode may be performed in the following four stages.

<Stage 1>

During a time period from $t_o$ to $t_1$, when the switch Q is turned on, a magnetic inductor current $I_{LM}$ and a parasitic inductor current $L_{lkg}$ increase, such that energy is stored in the magnetic inductor $L_m$ and the parasitic inductor $L_{lkg}$. In this case, the clamp capacitor $C_1$ is charged with energy corresponding to a difference between the parasitic inductor current $L_{lkg}$ and the magnetic inductor current $I_{LM}$, through the energy transfer diode $D_{O1}$.

<Stage 2>

During a time period from $t_1$ to $t_2$, when the switch Q is turned off, the parasitic inductor current charges the clamp capacitor $C_1$ through the clamp diode $D_1$. A secondary current in a coupled inductor indicates the difference between the parasitic inductor current $L_{lkg}$ and the magnetic inductor current $I_{LM}$ reflected by the turn ratio.

<Stage 3>

During a time period from $t_2$ to $t_3$, when the parasitic inductor current is 0, the clamp diode $D_1$ is turned off.

<Stage 4>

During a time period from $t_3$ to $t_o'$, when the switch Q is turned on, the output diode $D_{O2}$ is in a turn-on state until the parasitic inductor current is built-up to the magnetic inductor current.

FIG. 4 is a signal waveform diagram when the DC-DC converter is driven in the below resonance mode. The lower resonant mode may be performed in the following five stages.

<Stage 1>

At $t_0$, when the switch Q is turned on, the energy transfer diode $D_{O1}$ is turned on and the clamp diode $D_1$ and the output diode $D_{O2}$ are turned off. In this case, the magnetic inductor current and the parasitic inductor current are represented by the following Equations 5 and 6, respectively.

$$\frac{di_{Lm}}{dt} = \frac{nV_c}{L_m} \quad \text{[Equation 5]}$$

$$\frac{di_{Llkg}}{dt} = \frac{V_s - nV_c}{L_{lkg}} \quad \text{[Equation 6]}$$

A secondary current $i_2$ of the coupled inductor, which is represented by the following Equation 7, charges the clamp capacitor $C_1$. In this case, two types of modes exist, wherein both a primary current and the secondary current of the coupled inductor flows in the switch Q in a first mode, and the primary current minus the secondary current flows in the switch Q in a second mode. Accordingly, the second mode may have efficiency higher than the first mode.

$$i_2 = -n(i_{lkg} - i_{Lm}) \quad \text{[Equation 7]}$$

After the parasitic inductor $L_{lkg}$ has a half-period resonance to the clamp capacitor $C_1$, the parasitic inductor current and the magnetic inductor current increase together. In this case, the energy transfer diode $D_{01}$ is turned off.

<Stage 2>

When the switch Q is turned off, the current $I_{lkg}$ of the parasitic inductor $Li_{lkg}$ charges the parasitic capacitor of the switch Q up to the voltage $V_{c1}$ of the clamp capacitor $C_1$.

<Stage 3>

When the voltage of the parasitic capacitor of the switch Q becomes the same level as the voltage $V_{c1}$ of the clamp capacitor $C_1$, the clamp diode $D_1$ and the output diode $D_{02}$ are turned on. In this case, the magnetic inductor current and the parasitic inductor current are represented by the following Equations 8 and 9, respectively.

$$\frac{di_{Lm}}{dt} = \frac{n(V_c - V_0)}{L_m} \quad \text{[Equation 8]}$$

$$\frac{di_{Llkg}}{dt} = \frac{V_s - n(V_c - V_0) - V_c}{L_{lkg}} \quad \text{[Equation 9]}$$

<Stage 4>

When the coupled inductor current is 0, the clamp diode $D_1$ is turned off. In this case, the secondary coupled inductor current is a value in which the magnetic inductor current is reflected by a turn ratio.

<Stage 5>

When the magnetic inductor current is 0, the output diode $D_{02}$ is turned off.

Figure 5:
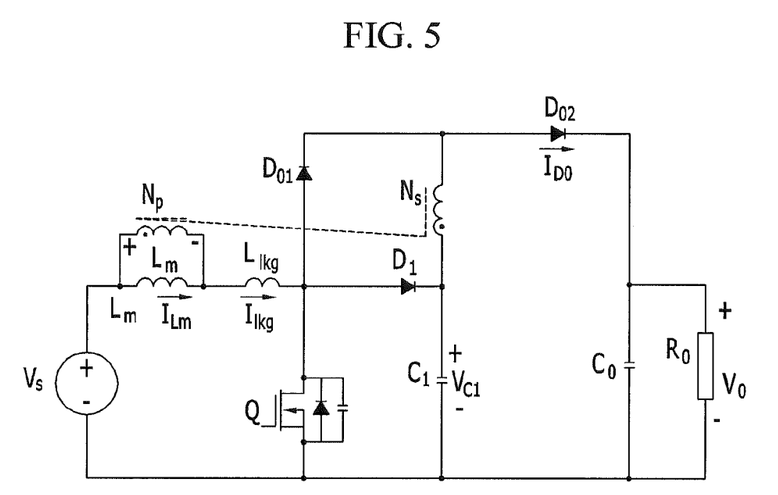
FIG. 5 is a circuit diagram illustrating another exemplary embodiment of a DC-DC converter according to the invention.
Figure 6:
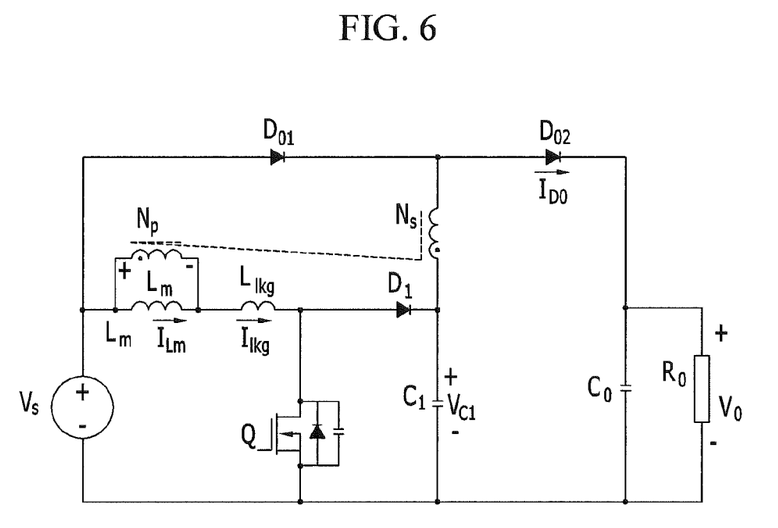
FIG. 6 is a circuit diagram illustrating still another exemplary embodiment of a DC-DC converter according to the invention.
Figure 7:
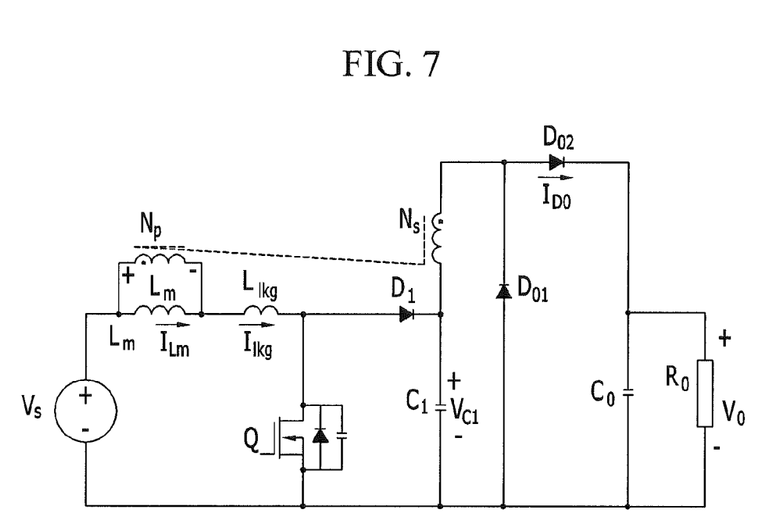
FIG. 7 is a circuit diagram illustrating yet still another exemplary embodiment of a DC-DC converter according to the invention.

FIG. 5 is a circuit diagram illustrating another exemplary embodiment of a DC-DC converter according to the invention, FIG. 6 is a circuit diagram illustrating still another exemplary embodiment of a DC-DC converter according to the invention, and FIG. 7 is a circuit diagram illustrating yet still another exemplary embodiment of a DC-DC converter according to the invention.

Referring to FIG. 5, the energy transfer diode $D_{01}$ is connected to the parasitic inductor $L_{lkg}$, and referring to FIG. 6, the energy transfer diode $D_{01}$ is connected to the magnetic inductor Lm. Referring to FIG. 7, a winding direction of $N_s$ indicated by a dot is changed.

Hereinafter, the invention will be described in more detail with reference to exemplary embodiments. However, it should be noted that the following examples are given only for illustrative purposes, and thus, the invention is not limited to the following examples.

Figure 8A:
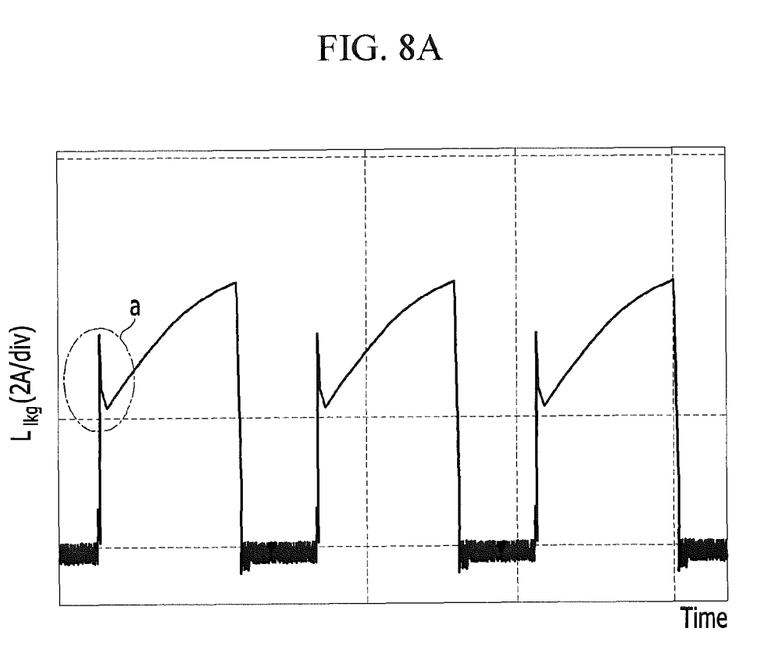
FIG. 8A is a current graph of a DC-DC converter according to an exemplary embodiment of the invention and FIG. 8B is a current graph of a conventional DC-DC converter.
Figure 8B:
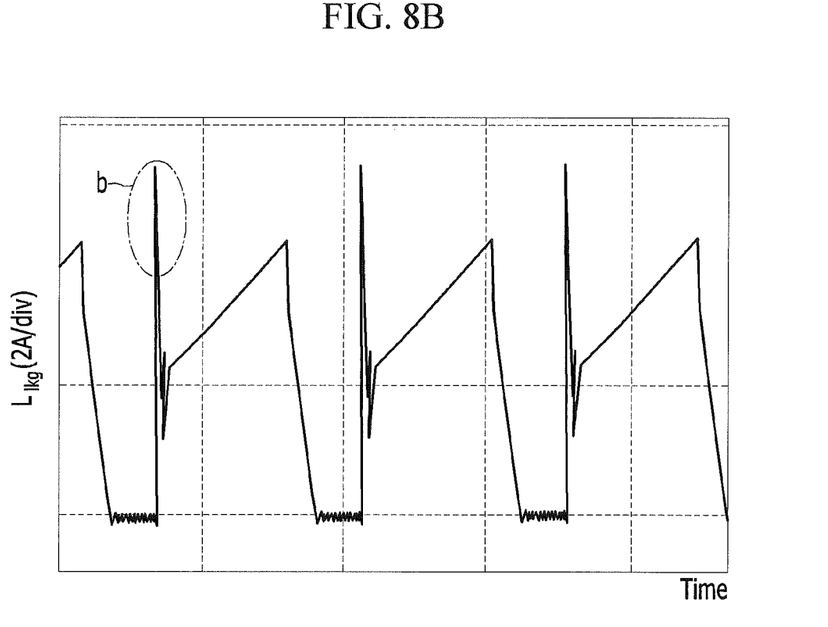
Figure 9A:
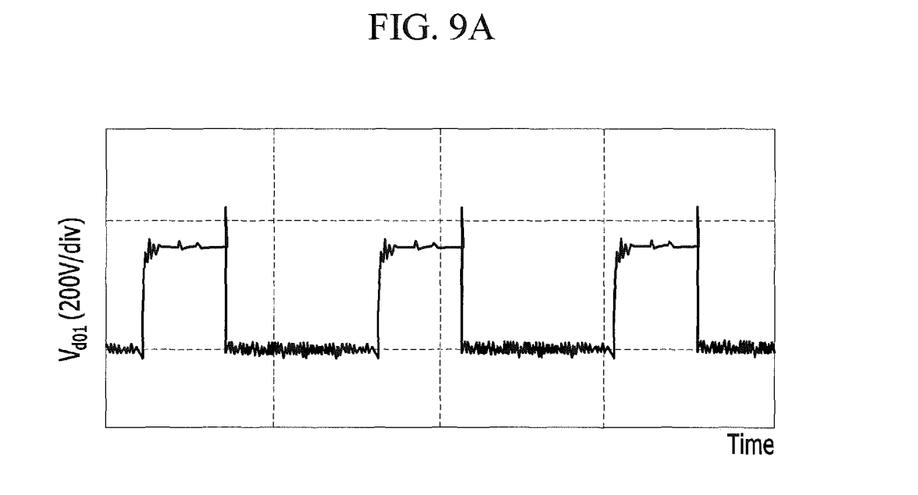
FIG. 9A is a voltage graph of a DC-DC converter according to an exemplary embodiment of the invention.

FIG. 8A is a current graph of a DC-DC converter according to an exemplary embodiment of the invention and FIG. 8B is a current graph of a conventional DC-DC converter. FIG. 9A is a voltage graph of a DC-DC converter according to an exemplary embodiment of the present invention, FIG. 9B is a voltage graph of a DC-DC converter according to another exemplary embodiment of the present invention, and FIG. 9C is a voltage graph of a conventional DC-DC converter.

Figure 9B:
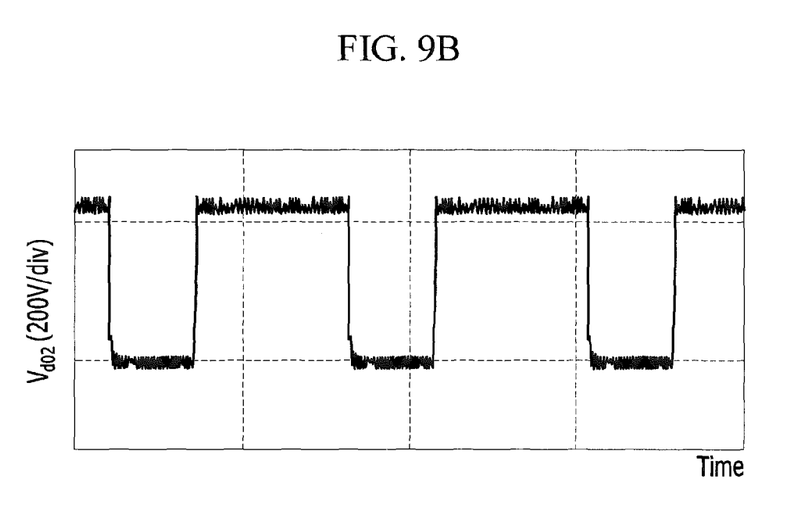
FIG. 9B is a voltage graph of a DC-DC converter according to another exemplary embodiment of the invention.

In the exemplary embodiments of FIGS. 8A, 9A and 9B, it is assumed that the DC-DC converter having the circuit diagram of FIG. 2 is used, the voltage of the input terminal $V_s$ is 24 V, the voltage of the output terminal $V_o$ is 220 V, the coupled inductor is PQ3511 ($L_m$=100 microhenries (μH), $L_{lkg}$=3 μH, n=1/3.5), the switch Q is IPP50CN10, the clamp diode $D_1$ is V20200C, and the energy transfer diode $D_{01}$ and the output diode $D_{02}$ are Super Barrier Rectifier (SBR®) from Diode Incorporated (http://www.diodes.com/products/sbr_product_information.html) having a voltage stress limit of 250 V. Voltages $V_{do1}$ and $V_{do2}$ of the energy transfer diode $D_{01}$ and the output diode $D_{02}$ are shown in FIGS. 9A and 9B, respectively. It should be noted that the above experimental conditions are given for illustrative purposes, and thus, the invention is not limited thereto.

Figure 9C:
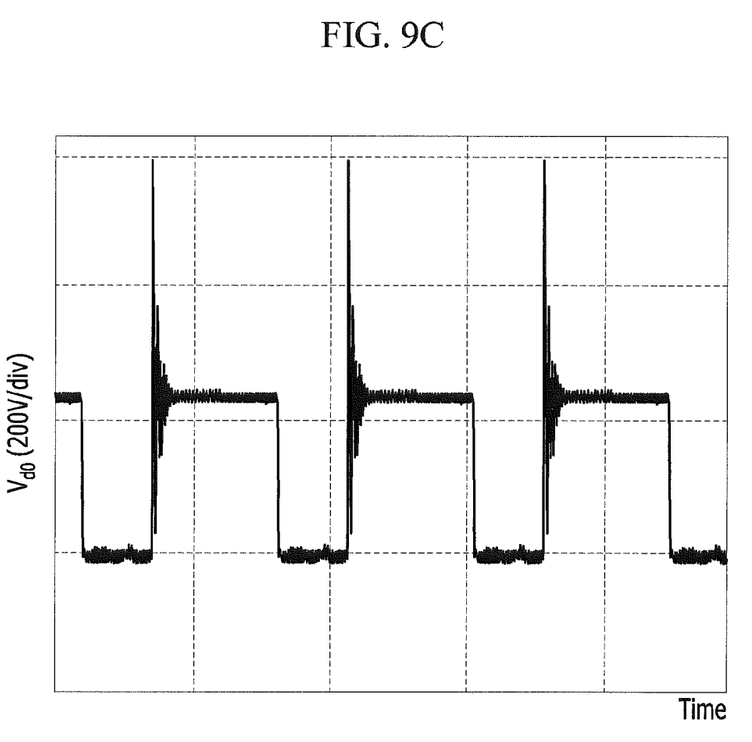
FIG. 9C is a voltage graph of a conventional DC-DC converter.

The conventional DC-DC converter of FIGS. 8B and 9C has the same circuit diagram as shown in FIG. 2 except for the energy transfer diode $D_{01}$. It is assumed that the voltage of the input terminal $V_s$ is 24 V, the voltage of the output terminal $V_o$ is 220 V, the coupled inductor is PQ3511 ($L_m$=100 μH, $L_{1kg}$=3 μH, n=1/3.5), the switch Q is IPP50CN10, the clamp diode $D_1$ is V20200C, and the output diode $D_{02}$ is an Ultra Fast Recovery Rectifier having a voltage stress limit of 600 V.

Current and voltage characteristics of the DC-DC converter according to exemplary embodiments of the invention and the prior art are shown in FIGS. 8A, 8B, and 9A to 9C. The current characteristic is measured in a unit of 2 amperes per division (2 A/div) and the voltage characteristic is measured in a unit of 200 volts per division (2V/div).

The DC-DC converter according to exemplary embodiments of the invention may use a SBR-based diode having a good characteristic because the voltage stress is limited. Accordingly, a reverse recovery current is reduced, as shown at circle "a" in FIG. 8A.

However, the conventional DC-DC converter may use a diode having a poor characteristic because the voltage stress is high at about 600 V. Accordingly, the reverse recovery current is increased, as shown at circle "b" in FIG. 8B, such that a conduction loss and noise may be increased.

According to exemplary embodiments of the invention, it is possible to reduce a voltage stress of circuit elements, increase efficiency of a DC-DC converter, and reduce an electromagnetic interference.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A direct current to direct current converter, comprising:
   an input terminal;
   an output terminal having a voltage higher than a voltage of the input terminal;
   a coupled inductor boost cell comprising a coupled inductor connected to the input terminal, a switch connected to the coupled inductor, and an output diode connected to the output terminal; and
   a clamp and energy transfer cell comprising a clamp diode connected to the coupled inductor, a clamp capacitor connected to the clamp diode, and an energy transfer diode connected to the output diode.

2. The direct current to direct current converter of claim 1, wherein:
   the coupled inductor comprises a magnetic inductor, and a parasitic inductor connected to the magnetic inductor.

3. The direct current to direct current converter of claim 2, wherein
   when the switch is turned on, energy from the input terminal is stored in the magnetic inductor and the parasitic inductor, and a difference between energy stored in the magnetic inductor and energy stored in the parasitic inductor is stored in the clamp capacitor.

4. The direct current to direct current converter of claim 3, wherein
   when the switch is turned off, energy stored in the magnetic inductor is transferred to the output terminal, and energy stored in the parasitic inductor is stored in the clamp capacitor to be transferred to the output terminal.

5. The direct current to direct current converter of claim 1, wherein
the clamp diode and the clamp capacitor limit a voltage applied to the switch.

6. The direct current to direct current converter of claim 1, wherein
the switch comprises a first terminal connected to the coupled inductor, and a second terminal connected to the input terminal.

7. The direct current to direct current converter of claim 6, wherein
the first terminal of the switch is connected to the clamp diode, and the second terminal of the switch is connected to the clamp capacitor.

8. The direct current to direct current converter of claim 7, wherein
the energy transfer diode comprises a first terminal connected to the second terminal of the switch, and a second terminal connected to the output diode.

9. The direct current to direct current converter of claim 7, wherein
the energy transfer diode comprises a first terminal connected to the first terminal of the switch, and a second terminal connected to the output diode.

10. The direct current to direct current converter of claim 7, wherein
the energy transfer diode comprises a first terminal connected to the coupled inductor and the input terminal, and a second terminal connected to the output diode.

11. The direct current to direct current converter of claim 1, wherein
the direct current to direct current converter is driven in a continuous conduction mode or a discontinuous conduction mode.

12. The direct current to direct current converter of claim 1, wherein
the direct current to direct current converter is driven in an above resonance mode or a below resonance mode.

13. A light emitting diode driving device, comprising
a direct current to direct current converter converting an input voltage into an output voltage; and
a light emitting diode connected to the direct current to direct current converter,
wherein the direct current to direct current converter comprises
an input terminal;
an output terminal having a voltage higher than a voltage of the input terminal;
a coupled inductor boost cell comprising a coupled inductor connected to the input terminal, a switch connected to the coupled inductor, and an output diode connected to the output terminal; and
a clamp and energy transfer cell comprising a clamp diode connected to the coupled inductor, a clamp capacitor connected to the clamp diode, and an energy transfer diode connected to the output diode.

14. The light emitting diode driving device of claim 13, wherein
the coupled inductor comprises a magnetic inductor, and a parasitic inductor connected to the magnetic inductor.

15. The light emitting diode driving device of claim 13, wherein
the switch comprises a first terminal connected to the coupled inductor, and a second terminal connected to the input terminal.

16. The light emitting diode driving device of claim 15, wherein
the first terminal of the switch is connected to the clamp diode, and the second terminal of the switch is connected to the clamp capacitor.

17. The light emitting diode driving device of claim 16, wherein
the energy transfer diode comprises a first terminal connected to the second terminal of the switch, and a second terminal connected to the output diode.

18. The light emitting diode driving device of claim 16, wherein
the energy transfer diode comprises a first terminal connected to the first terminal of the switch, and a second terminal connected to the output diode.

19. The light emitting diode driving device of claim 16, wherein
the energy transfer diode comprises a first terminal connected to the coupled inductor, and the input terminal and a second terminal connected to the first terminal and the output diode.

20. A method of driving a light emitting diode light source using a direct current to direct current converter, the method comprising:
providing an input voltage;
transferring, responsive to a turn-on state of a switch, energy from the input voltage to a magnetic inductor and a parasitic inductor, while a difference between energy stored in the magnetic inductor and energy stored in the parasitic inductor is stored in a clamp capacitor; and
transferring, responsive to a turn-off state of the switch, energy stored in the magnetic inductor to an output terminal and energy stored in the parasitic inductor to the clamp capacitor to be transferred to the output terminal, wherein
a voltage across an output diode is clamped to the output voltage by using an energy transfer diode connected between the output diode and the switch or the input voltage, thereby reducing a voltage stress on the output diode,
wherein the direct current to direct current converter includes:
an input terminal;
an output terminal having a voltage higher than a voltage of the input terminal;
a coupled inductor boost cell comprising a coupled inductor connected to the input terminal, a switch connected to the coupled inductor, and then output diode connected to the output terminal;
the coupled inductor includes the magnetic inductor, and the parasitic inductor connected to the magnetic inductor and
a clamp and energy transfer cell comprising a clamp diode connected to the coupled inductor, the clamp capacitor connected to the clamp diode, and the energy transfer diode connected to the output diode.

* * * * *